United States Patent
Gage

[19]

[11] Patent Number: 5,984,823
[45] Date of Patent: Nov. 16, 1999

[54] DIFFERENTIAL WITH SHAFT LOCKING MECHANISM

[75] Inventor: Garrett W. Gage, Goodrich, Mich.

[73] Assignee: American Axle & Manufacturing, Inc., Detroit, Mich.

[21] Appl. No.: 09/140,873

[22] Filed: Aug. 27, 1998

[51] Int. Cl.[6] .................................................. F16H 48/06
[52] U.S. Cl. .......................... 475/248; 475/252; 475/331; 74/606 R
[58] Field of Search ..................... 475/248, 331, 475/220, 230, 234, 252; 74/606 R

[56] References Cited

U.S. PATENT DOCUMENTS

| | | | |
|---|---|---|---|
| Re. 20,149 | 10/1936 | Padgett et al. ..................... | 74/606 R X |
| 3,264,900 | 8/1966 | Hartupee . | |
| 3,470,768 | 10/1969 | Ford et al. . | |
| 4,305,313 | 12/1981 | Konkle . | |
| 4,455,889 | 6/1984 | Hauser ..................... | 475/230 |
| 4,491,035 | 1/1985 | Gleasman et al. . | |
| 4,495,835 | 1/1985 | Gleasman . | |
| 4,512,211 | 4/1985 | Stritzel . | |
| 4,722,244 | 2/1988 | Tsuchiya et al. ................. | 74/606 R X |
| 4,787,267 | 11/1988 | Kessler et al. . | |
| 4,885,958 | 12/1989 | Stritzel ................. | 475/220 X |
| 5,221,238 | 6/1993 | Bawks et al. . | |
| 5,267,731 | 12/1993 | Scudder et al. . | |
| 5,273,498 | 12/1993 | Dhillon et al. . | |
| 5,389,048 | 2/1995 | Carlson . | |
| 5,492,510 | 2/1996 | Bowerman .............................. | 475/252 |
| 5,554,081 | 9/1996 | Bowerman . | |
| 5,556,351 | 9/1996 | Hiraishi et al. . | |
| 5,584,777 | 12/1996 | Sander et al. . | |
| 5,590,572 | 1/1997 | Valente . | |
| 5,671,640 | 9/1997 | Valente ................................. | 475/220 X |
| 5,823,907 | 10/1998 | Teraoka et al. ......................... | 475/248 |

FOREIGN PATENT DOCUMENTS 651303  2/1994  Australia .

*Primary Examiner*—Dirk Wright
*Assistant Examiner*—Peter T. Kwon
*Attorney, Agent, or Firm*—Harness, Dickey & Pierce, P.L.C.

[57] ABSTRACT

A shaft retention and spacer mechanism, referred to as a button lock assembly, is installed between the ends of the axle shafts within the differential housing of a differential assembly. The end of each axle shaft includes a button-like end pad formed by an annular groove that is adapted to receive a C-clip therein for axially locating and restraining a side gear between the differential housing and the axle shaft. The button lock assembly includes a spacer block having a peripheral flange extending outwardly from its opposite lateral face surfaces so as to define a pair of open-ended retention chambers. The spacer block is disposed between the axle shafts such that the button-like end pads are positioned within the retention chambers. The button lock assembly further includes a lock cap that is secured to the spacer block for enclosing the open end of the retention chambers to surround the end pads. Upon installation of the C-clip into the grooves, the end pads are retained in the retention chambers of the spacer block and the C-clips are laterally bounded by the side gear and the button lock assembly.

18 Claims, 4 Drawing Sheets

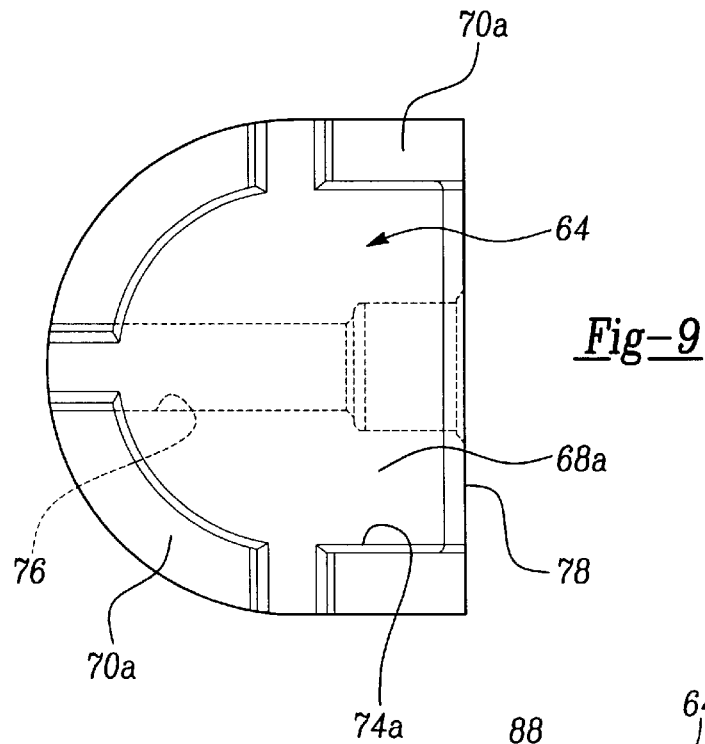
_Fig-9_
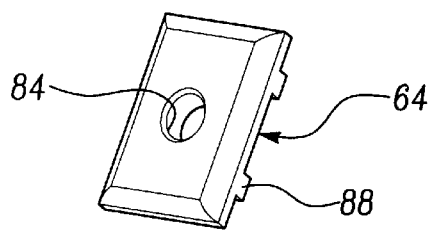
_Fig-10_
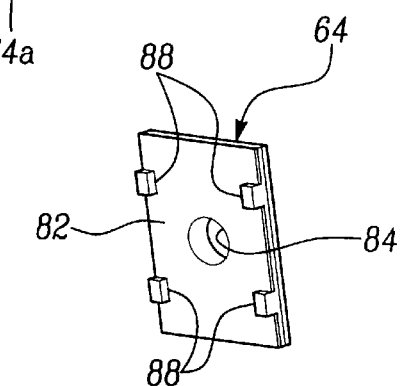
_Fig-11_
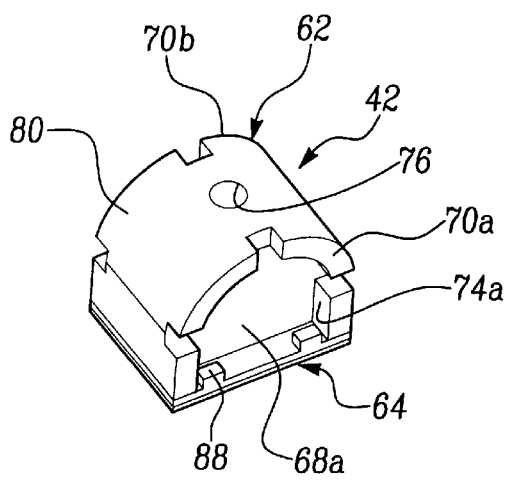
_Fig-12_
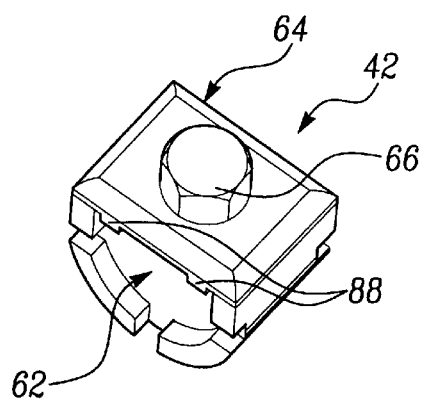
_Fig-13_

5,984,823

DIFFERENTIAL WITH SHAFT LOCKING MECHANISM

FIELD OF THE INVENTION

The present invention relates to differentials for use in automotive drivelines and, more particularly, to a spacer assembly for a helical gear differential.

BACKGROUND OF THE INVENTION

Differentials of the type used in automotive drivelines generally include a planetary gearset supported within a differential housing to facilitate relative rotation (i.e., speed differentiation) between a pair of output shafts. In helical gear differentials, the gearset typically includes helical side gears fixed to the end of the output shafts that are meshed with paired sets of helical pinions journalled in gear pockets formed in the differential housing. Since the gear pockets are parallel to the rotary axis of the differential housing, the pinions rotate on axes that are parallel to the common axis of the output shafts and the side gears. In response to speed differentiation between the output shafts, the torque transmitted through meshed engagement of the side gears and pinions generates thrust forces that are exerted by the gear components against the wall surface of the gear pockets and other thrust surfaces within the differential housing to frictionally limit such speed differentiation and proportion torque between the output shafts.

One problem associated with some conventional helical gear differentials is axial separation of the output shafts within the differential housing relative to the side gears. A related problem involves maintaining a proper spacial relationship between the ends of the output shafts. Most typically, C-clip retainers mounted in grooves are utilized for retaining the ends of the output shafts in relation to the side gears. In addition, it is also known to install spacers (i.e., pins, blocks, thrust plates, etc.) in the differential housing between the terminal ends of the output shafts. Due to limited access to the gearset, however, such spacers may be difficult to install within the differential housing. Examples of conventional spacer and clip arrangements in helical differentials are shown in U.S. Pat. Nos. 4,495,835, 4,512,221, 5,221,238, 5,554,081 and 5,671,640.

SUMMARY OF THE INVENTION

Thus, it is an object of the present invention to provide a spacer assembly for use in a helical differential which is superior to conventional C-clip retention and spacing devices in terms of function and simplified assembly.

According to a preferred embodiment of the present invention, a shaft retention and spacer mechanism, hereinafter referred to as a button lock assembly, is installed between the ends of the axle shafts within the differential housing of a differential assembly. The end of each axle shaft includes a button-like end pad formed by an annular groove that is adapted to receive a C-clip therein for axially locating and restraining a side gear between the differential housing and the axle shaft. The button lock assembly includes a spacer block having a peripheral flange extending outwardly from its opposite lateral face surfaces so as to define a pair of open-ended retention chambers. The spacer block is disposed between the axle shafts such that the button-like end pads are positioned within the retention chambers. The button lock assembly further includes a lock cap that is secured to the spacer block for enclosing the open end of the retention chambers and surrounding the end pads. Upon installation of the C-clip into the grooves, the end pads are retained in the retention chambers of the spacer block and the C-clips are laterally bounded by the side gear and the button lock assembly. In this manner, the axial spacing between the shafts is maintained and unintended release of the C-clips is prevented. Moreover, the button lock assembly is free to rotate with respect to either axle shaft and is easily installed through conventional windows formed in the differential housing.

Further areas of applicability of the present invention will become apparent from the detailed description provided hereinafter. It should be understood however that the detailed description and specific examples, while indicating a preferred embodiment of the invention, is intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 9 is an enlarged end view of the spacer block;

FIG. 10 is a first perspective view of a lock cap associated with the button lock assembly of the present invention;

FIG. 11 is a second perspective view of the lock cap;

FIG. 12 is a first perspective view of the button lock assembly; and

FIG. 13 is a second perspective view of the button lock assembly of the present invention.

DETAILED DESCRIPTION OF THE PREFERRED EMBODIMENT

Figure 1:
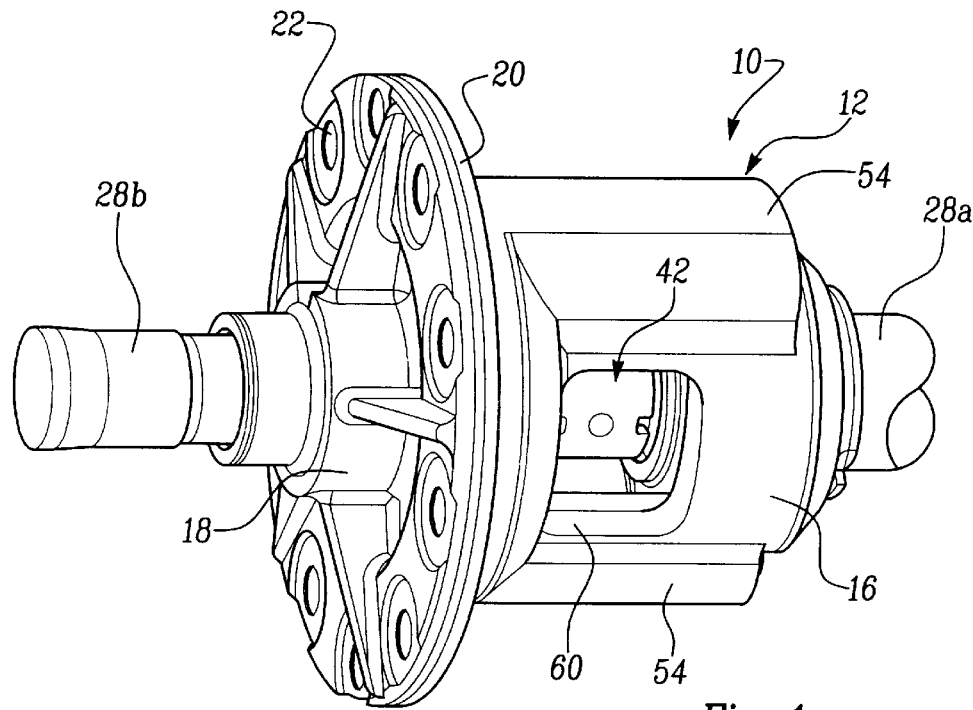
FIG. 1 is a perspective view of a differential assembly equipped with the button lock assembly of the present invention.
Figure 2:
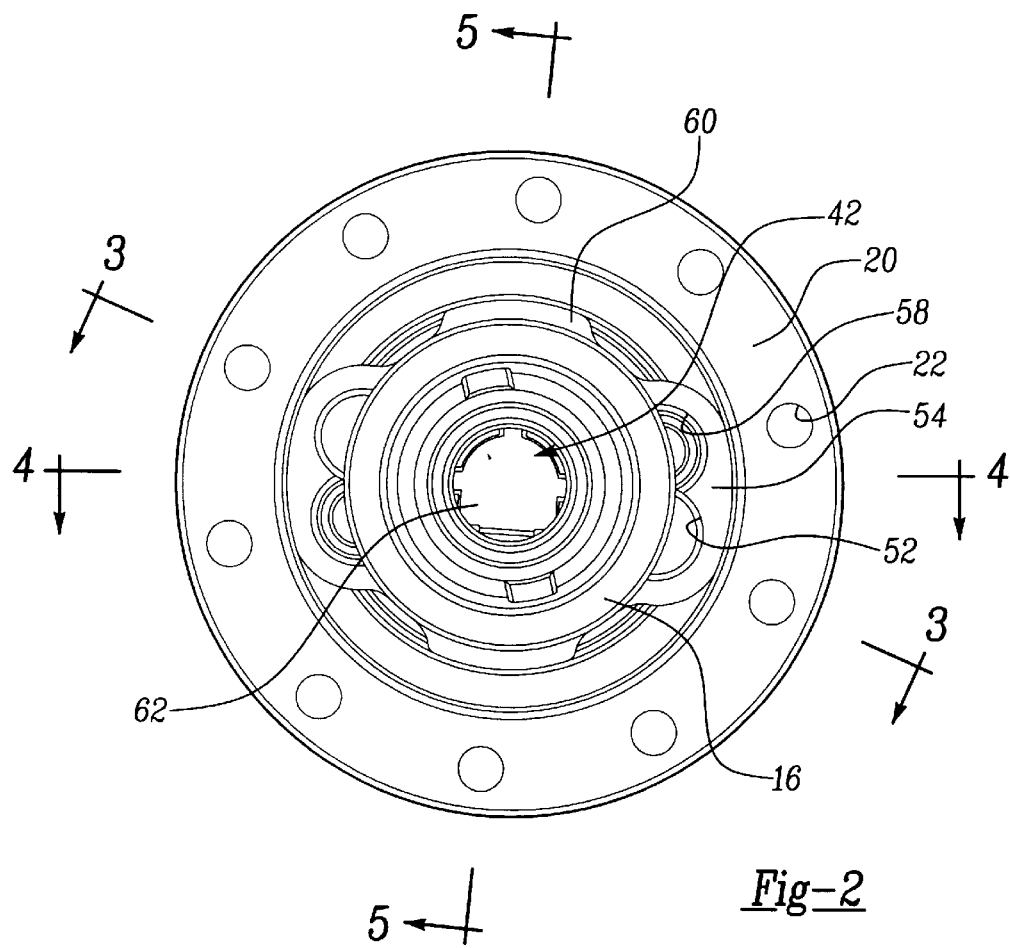
FIG. 2 is an end view of the differential assembly shown in FIG. 1.
Figure 3:
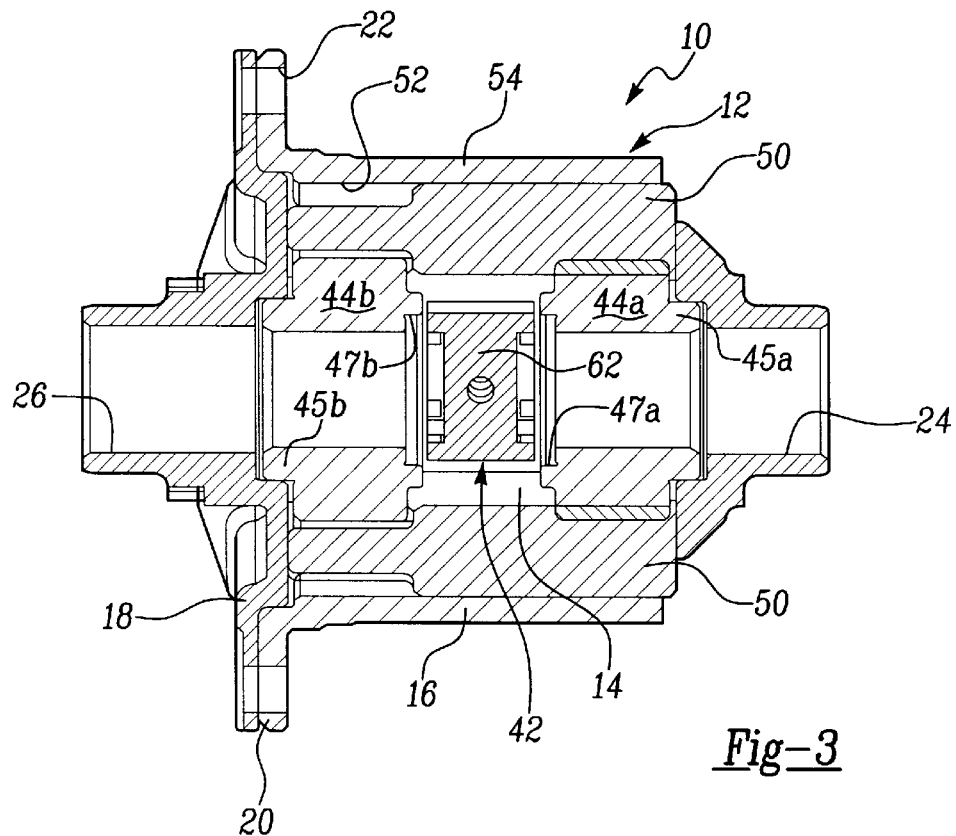
FIG. 3 is a sectional view taken generally along line 3—3 of FIG. 2 with the axle shafts removed.
Figure 4:
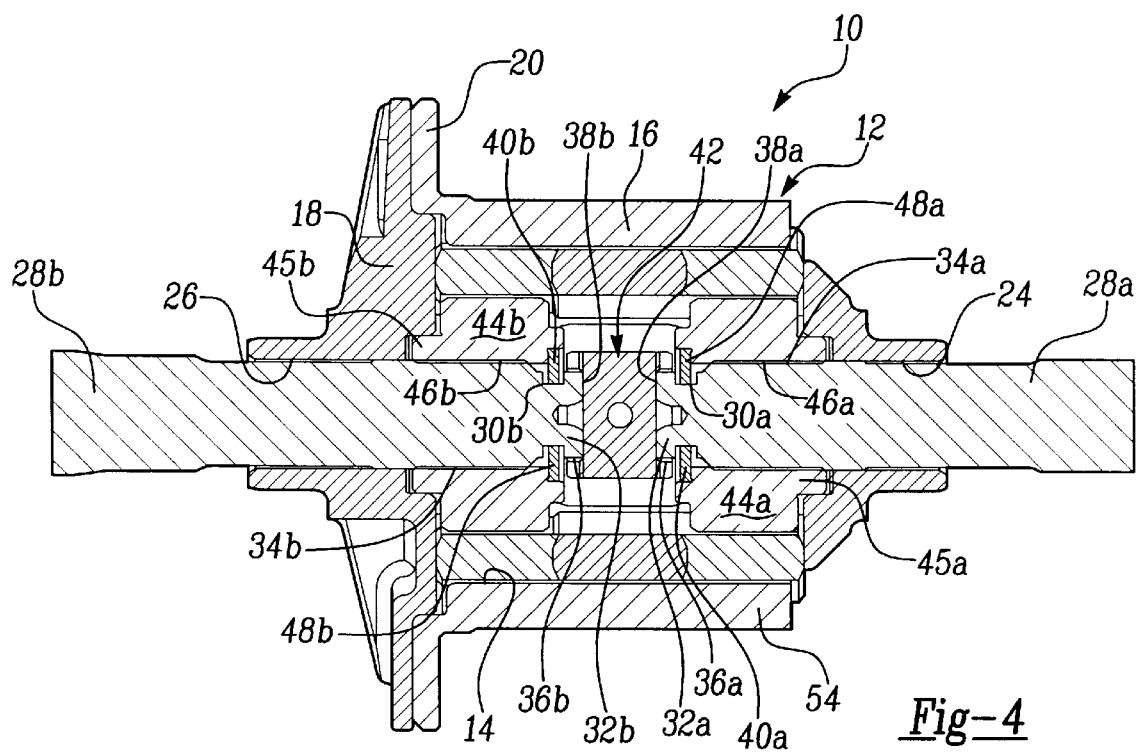
FIG. 4 is a sectional view taken generally along line 4—4 of FIG. 2.
Figure 5:
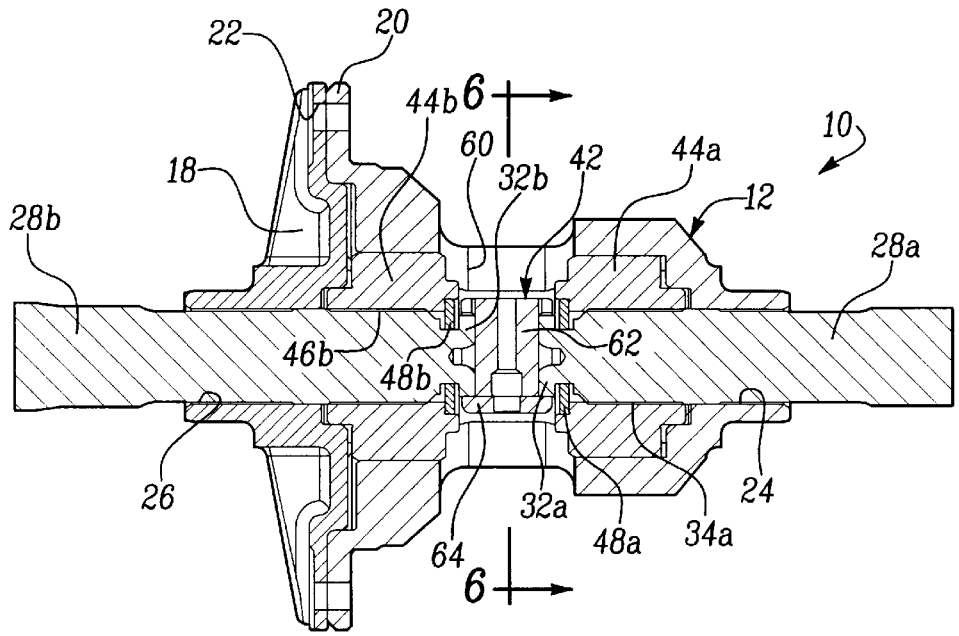
FIG. 5 is a sectional view taken generally along line 5—5 of FIG. 2.
Figure 6:
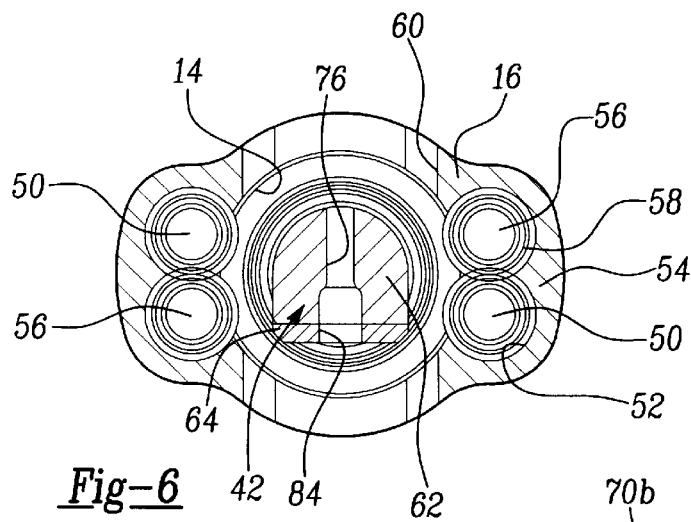
FIG. 6 is a sectional view taken generally along line 6—6 of FIG. 5.
Figure 7:
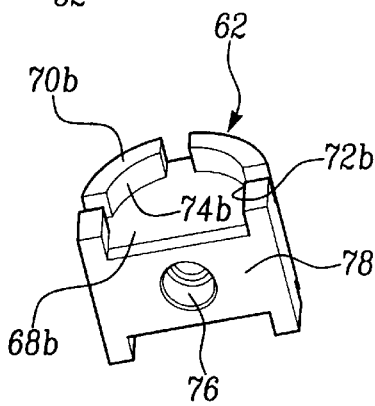
FIG. 7 is a first perspective view of the spacer block associated with the button lock assembly of the present invention.
Figure 8:
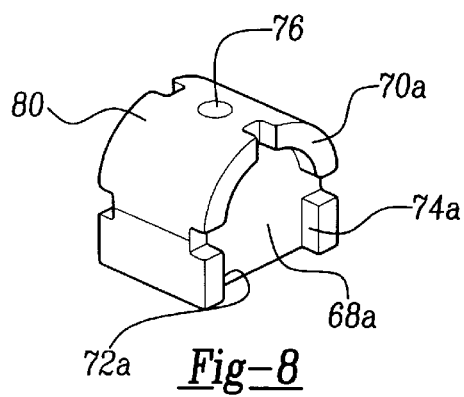
FIG. 8 is a second perspective view of the spacer block.

With reference to FIGS. 1–13, a shaft retention mechanism for use with a differential assembly 10 will be described. Differential assembly 10 will be described in sufficient detail to describe the structure and function of the shaft retention mechanism. In particular, differential assembly 10 is of the helical parallel-axis type used in motor vehicle driveline applications. However, it is to be understood that the shaft retention mechanism of the present invention is applicable for use with many variants of differential assembly 10 and, as such, the particular structure shown is intended merely to be exemplary in nature.

Differential assembly 10 includes a housing assembly 12 which defines an internal chamber 14. Housing assembly 12 includes a main drum 16 and an end cap 18 which is secured to a radial flange 20 of drum 16 by a plurality of bolts (not shown) installed through aligned mounting bores 22. As is known, a ring or bevel gear can be fixed to radial flange 20 on housing assembly 12 to transfer rotary power (i.e., drive torque) thereto. Housing assembly 12 defines a pair of axially aligned openings 24 and 26 in communication with chamber 14 and which are adapted to receive and rotatably support the end segments of a pair of output shafts, hereinafter referred to as axle shafts 28a and 28b. The end segment of axle shafts 28a, 28b includes a corresponding recessed annular groove 30a, 30b which separates a button-like end pad 32a, 32b from an externally-splined segment 34a, 34b. End pads 32a, 32b have a corresponding circular peripheral surface 36a, 36b, an outer face surface 38a, 38b, and an inner face surface 40a, 40b. The outer diameter of end pads 32a, 32b is shown to be slightly smaller than the outer diameter of splined segment 34a, 34b on shafts 28a, 28b. As will be detailed, a button lock assembly 42 is installed between end pads 32a, 32b to maintain the axial spacing between shafts 28a and 28b and prevent axial separation thereof.

Differential assembly 10 includes a planetary gearset which is operable for transferring drive torque from housing assembly 12 to axle shafts 28a, 28b in a manner facilitating speed differential therebetween. The helical gearset is mounted in chamber 14 and includes a pair of side gears 44a, 44b having internal splines 46a, 46b meshed with external splines 34a, 34b on a corresponding one of axle shaft 28a, 28b. In addition, side gears 44a, 44b include axial hubs 45a, 45b which are retained in corresponding annular sockets formed in drum 16 and end cap 18 of housing assembly 12, and annular chambers 47a, 47b. C-shaped retainer springs, or C-clips 48a, 48b, are retained in aligned grooves 30a, 30b and chambers 47a, 47b for axially positioning and restraining side gears 44a, 44b between end wall surfaces of housing assembly 12 and end pads 32a, 32b on shafts 28a, 28b. The helical gearset also includes a series of first pinions 50 journally supported in pockets 52 formed in raised hub segments 54 of drum 16, and a series of second pinions 56 journally supported in pockets 58 also formed in hub segments 54 of drum 16. Pockets 52 and 58 are formed in paired sets such that they communicate with each other and with chamber 14. In addition, pockets 52 and 58 are aligned to be substantially parallel to the rotational axis of shafts 28a, 28b. When assembled, first pinions 50 mesh with side gear 44a while second pinions 56 mesh with side gear 44b. Additionally, the paired sets are arranged such that one of first pinions 50 also meshes with one of second pinions 56. Windows 60 are formed in drum 16 between hub segments 54 and are provided for permitting access to the gearset within chamber 14.

In accordance with the present invention, button lock assembly 42 is provided for maintaining side gears 44a, 44b and axle shafts 28a, 28b in axially spaced relation relative to each other while preventing unintentional release of C-clips 48a, 48b from grooves 30a, 30b. Button lock assembly 42 includes a spacer block 62 and a lock cap 64 which, upon assembly, can be secured together via a threaded fastener 66. As best seen from FIGS. 7 and 8, spacer block 62 has a pair of laterally-spaced planar face surfaces 68a, 68b. Extending outwardly from face surfaces 68a, 68b are peripheral flanges 70a, 70b which, with face surfaces 68a, 68b, define horseshoe-shaped retention chambers 72a, 72b. Retention chambers 72a, 72b are configured such that corresponding outer face surfaces 38a, 38b of end pads 32a, 32b are adapted to be aligned in close proximity to corresponding face surfaces 68a, 68b of spacer block 62 while peripheral surfaces 36a, 36b of end pads 32a, 32b are aligned in close proximity to corresponding inner edge surfaces 74a, 74b of flanges 70a, 70b. A threaded bore 76 is shown to extend between a planar mounting surface 78 and an outer surface 80 of spacer block 62. Upon assembly of C-clips 48a, 48b into grooves 30a, 30b and chambers 47a, 47b, spacer block 62 is passed through one of windows 60 in drum 16 such that the open end of flanges 70a, 70b is slid over peripheral surfaces 36a, 36b of end pads 32a, 32b. Once end pads 32a, 32b are positioned within retention chambers 72a, 72b, a surface 82 of lock cap 64 is aligned with mounting surface 80 of spacer block 62 such that its aperture 84 is aligned with threaded bore 76. In this position, as best shown in FIGS. 12 and 13, lugs 88 extending from opposite edges of surface 82 on lock cap 64 enclose the open end of retention chambers 70a, 70b. Thereafter, fastener 66 is threaded through lock cap 64 and into spacer block 62 for establishing button lock assembly 42. Button lock assembly 42 allows for the installation of the C-shaped retainer clips 48a, 48b while at the same time keeping axle shafts 28a, 28b separated and C-shaped retainer clips 48a, 48b in place. Once installed, button lock assembly 42 is free to rotate with respect to either axle shaft 28a, 28b and housing assembly 12.

When a vehicle is under cornering conditions, the outside tire in the corner acts to thrust spacer block 62 against the opposite one of side gear 44a, 44b. Button lock assembly 42 maintains the proper spatial relationship of the axle shafts 28a, 28b and the side gears 44a, 44b under cornering conditions. As such, button lock assembly 42 is, essentially, a non-rotatably constrained axle shaft retention method for C-clip axles.

The invention being thus described, it will be obvious that the same may be varied in many ways. Such variations are not to be regarded as a departure from the spirit and scope of the invention, and all such modifications, as would be obvious to one skilled in the art, are intended to be included within the scope of the following claims.

What is claimed is:

1. A differential comprising:
    a housing defining a chamber and a pair of aligned apertures;
    a pair of output shafts having end segments extending through said aligned apertures in said housing and positioned in said chamber;
    a gearset for transferring rotary power from said housing to said output shaft while permitting speed differential therebetween, said gearset retained in said chamber and including a pair of side gears fixed to said end segments of said output shafts; and
    a button lock assembly including a spacer block disposed between said end segments of said output shafts and having peripheral flanges extending outwardly from its opposite lateral face surfaces to define open-ended retention chambers within which said end segments of said output shafts are retained, said button lock assembly further including a lock cap that is mounted to said spacer block to enclose said retention chambers for enclosing said end segments of said output shafts, and a fastener for securing said lock cap to said spacer block.

2. The differential of claim 1 wherein said end segments of said output shafts each include an annular groove and an end pad adapted to be retained in said retention chamber, and further comprising a retainer clip adapted for retention in said annular groove and against a corresponding one of said side gears for axially locating and restraining said side gear on said end segment of said output shaft between said retainer clip and said housing.

3. The differential of claim 2 wherein said retainer clip is adapted to be retained in an annular chamber formed in said side gear and which is alignable with said annular groove in said output shaft such that said retainer clip is laterally bounded by said side gear and said button lock assembly.

4. The differential of claim 2 wherein said end pad has an outer face surface adapted to be located in proximity to said lateral face surface of said spacer block and a peripheral surface adapted to be located in proximity to an inner edge surface of said peripheral flange.

5. The differential of claim 2 wherein said lock cap has a face surface adapted to be located in proximity to a mounting surface on said spacer block such that a lug extending from said face surface of said lock cap encloses said open end of said retention chamber.

6. The differential of claim 1 wherein said spacer block has a bore and said lock cap has an aperture alignable with said bore, and wherein said fastener extends through said aperture and into said bore to secure said lock cap to said spacer block.

7. The differential of claim 1 wherein said gearset further includes pinions rotatably mounted in gear pockets formed in said housing and which communicate with said chamber, said pinions including a first pinion meshed with one of said side gears and a second pinion meshed with the other of said side gears and said first pinion.

8. The differential of claim 7 wherein said gear pockets are parallel to a rotary axis of said output shafts.

9. A differential assembly comprising:
   a differential housing defining a chamber and a pair of aligned openings communicating with said chamber;
   a pair of output shafts extending through said openings in said differential housing and having end segments located within said chamber;
   a pair of side gears disposed in said chamber and fixed to said end segments of said output shafts;
   paired sets of pinions rotatably mounted within said differential housing and in meshed engagement with each other and with one of said side gears; and
   a button lock assembly including a spacer block having a body portion disposed between said end segments of said output shafts and retainer flanges extending from opposite sides of said body portion to partially surround said end segments of said output shafts, said button lock assembly further including a lock cap mounted to said body portion and extending beyond an edge of said body portion to define a cap flange which cooperates with said retainer flanges to completely surround said end segments and prevent said button lock assembly from moving laterally relative to said output shafts.

10. The differential assembly of claim 9 wherein said body portion of said spacer block includes a threaded bore for receiving a threaded fastener inserted through an aperture in said lock cap for securing said lock cap to said spacer block.

11. The differential assembly of claim 9 wherein said button lock assembly is free to rotate relative to said output shafts and said differential housing.

12. The differential assembly of claim 9 wherein said body portion and said retainer flanges of said spacer block are generally U-shaped to define a pair of open-ended retention chambers within which said end segments of said output shafts are located.

13. The differential assembly of claim 9 wherein said retainer flanges define a pair of open-end retention chambers within which said end segments of said output shafts are retained, and wherein said end segments of said output shafts each include an annular groove and an end pad adapted to be retained in said retention chamber, and further comprising a retainer clip adapted for retention in said annular groove and against a corresponding one of said side gears for axially locating and restraining said side gear on said end segment of said output shaft between said retainer clip and said housing.

14. The differential assembly of claim 13 wherein said retainer clip is adapted to be retained in an annular chamber formed in said side gear and which is alignable with said annular groove in said output shaft such that said retainer clip is laterally bounded by said side gear and said button lock assembly.

15. A differential assembly for supplying driving torque from a drive shaft to a pair of output shafts, comprising:
   a differential housing adapted to be rotatably driven by the drive shaft, said housing defining a chamber having shaft openings at opposite ends thereof;
   a pair of side gears disposed in said chamber, said side gears being non-rotatably mounted to end segments of the output shafts which extend through said shaft openings;
   a pair of meshed differential pinions rotatably mounted within gear pockets formed in said differential housing, said pinions having a longitudinal axis parallel to the axis of said side gears with each pinion meshed with one of said side gears; and
   a button lock assembly including a spacer block having a body portion disposed between said end segments of the output shafts and a peripheral flange extending from opposite sides of said body portion which encloses an outer surface of said end segments of the output shafts, wherein said button lock assembly is free to rotate relative to the output shafts and said differential housing.

16. The differential assembly of claim 15 wherein said button lock assembly further includes a lock cap attached to said spacer block, said lock cap cooperating with said peripheral flange for securing said button lock assembly between said end segments of the output shafts.

17. The differential assembly of claim 15 wherein said peripheral flanges define a pair of open-end retention chambers within which said end segments of the output shafts are retained, and wherein said end segments of the output shafts each include an annular groove and an end pad adapted to be retained in said retention chamber, and further comprising a retainer clip adapted for retention in said annular groove and against a corresponding one of said side gears for axially locating and restraining said side gear on said end segment of the output shaft between said retainer clip and said housing.

18. The differential assembly of claim 17 wherein said retainer clip is adapted to be retained in an annular chamber formed in said side gear and which is alignable with said annular groove in the output shaft such that said retainer clip is laterally bounded by said side gear and said button lock assembly.

* * * * *